United States Patent
Koops et al.

(10) Patent No.: US 6,310,991 B1
(45) Date of Patent: Oct. 30, 2001

(54) INTEGRATED OPTICAL CIRCUIT

(75) Inventors: Hans Wilfried Koops, Ober-Ramstadt; Wolfgang Dultz, Frankfurt am Main, both of (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/423,956

(22) PCT Filed: Apr. 29, 1998

(86) PCT No.: PCT/EP98/02532

§ 371 Date: Nov. 16, 1999

§ 102(e) Date: Nov. 16, 1999

(87) PCT Pub. No.: WO98/53350

PCT Pub. Date: Nov. 26, 1998

(30) Foreign Application Priority Data

May 17, 1997 (DE) ............................... 197 20 784

(51) Int. Cl.[7] .............. G02B 6/12; G02B 6/122; G02B 6/124
(52) U.S. Cl. .............. 385/14; 385/15; 385/129; 385/31
(58) Field of Search .................. 385/14, 15, 31, 385/129, 130

(56) References Cited

U.S. PATENT DOCUMENTS 6,134,369 * 10/2000 Kurosawa .
6,175,671 * 1/2001 Roberts .
6,204,952 * 3/2001 Hinkov et al. .

FOREIGN PATENT DOCUMENTS

19526734-A1 * 1/1997 (DE) .
WO-95/30917 * 11/1995 (WO) .
WO-96/27225 * 9/1996 (WO) .

OTHER PUBLICATIONS

Cheng et al; "Fabrication pf Photonic Band–Gap Crystals"; Journal of Vacuum Science and Technology; vol. 13, No. 6, 1995, pp. 2696–2700.*
Koops; "Photonic Crystals Built By Three–Dimensional Additive Lithography Enable Integrated Optics of High Density", SPIE, vol. 2849, 1996; pp. 248–256.*

* cited by examiner

Primary Examiner—Hung N. Ngo
(74) Attorney, Agent, or Firm—Kenyon & Kenyon

(57) ABSTRACT

An integrated optical circuit is described. The optical circuit includes a silicon substrate and waveguides disposed thereon, at least one photonic crystal is provided as a waveguide.

9 Claims, 3 Drawing Sheets

INTEGRATED OPTICAL CIRCUIT

FIELD OF THE INVENTION

The present invention relates to an integrated optical circuit having a silicon substrate and waveguides disposed thereon.

BACKGROUND INFORMATION

Integrated optical circuits are needed in communications engineering for various purposes, such as for the distribution, combining, spectral partitioning or switching of information-modulated light fluxes. In addition, it is also possible to implement other circuits with the aid of optical structures, such as computer circuits.

At present, integrated optical circuits are constructed using waveguides made of polymers or III–V compound semiconductors which are structured by lithographic processes.

Suitable as the optically active elements of such circuits are, inter alia, photonic crystals which, because of their small geometrical dimensions, require a waveguide pattern into which they are inserted in order to develop their full effect. Such waveguide patterns are usually strip waveguides made of polymer or semiconductor material.

These waveguide patterns can be produced in a complementary structure which, through its form, prevents the propagation of the photon pulses in the matter and, through selective built-in defects, allows propagation into otherwise completely reflecting matter. In this context, there is not a step change (sudden change) in refractive index as in the guiding of waves in optical waveguides formed by doping or in the form of strip waveguides, instead—theoretically stated—forbidden bands limit the state solution of the eigensolutions desired for specific wavelengths for propagating these waves. These waveguides are described, for example, in a reference by A. Mekis et AL in Physical Review Letters, Volume 77, No. 18, p. 3787.

SUMMARY

An object of the present invention is to provide an integrated optical circuit in which such waveguides are used for various functions and which can be manufactured with the requisite precision.

This objective is achieved according to the present invention, in that at least one photonic crystal is provided as a waveguide. Further waveguides may be provided in the form of strip waveguides, an insulating layer being disposed between the strip waveguides and the silicon substrate, and the photonic crystal extending from a plane below the lower boundary surface of the waveguides to beyond the upper boundary surface of the waveguides.

The commercially available material "silicon on insulator", for example from the manufacturer SOITEC SA., Grenoble, France, can advantageously be used to manufacture the circuit according to the present invention. This material has good transmission properties for wavelengths of 1.55 μm. Silicon has a very high dielectric constant of 12 for such waveguides, which can also be used in the case of photonic crystals. Special photonic crystals, inserted with very low insertion loss at defined locations of the circuit, ensure the functioning of the circuit, for example as a computing circuit, it being possible for the entire circuit to be made very small. Thus, for example, 6 periods of the lattice of the photonic crystals with a lattice spacing of ⅓ of the wavelength are sufficient to achieve an attenuation of 35 dB.

One advantageous embodiment of the circuit according to the present invention is that the at least one photonic crystal is formed by needles having a high dielectric constant in the form of a two-dimensional periodic lattice with imperfections. However, it is also perfectly possible for the at least one photonic crystal to be formed by a body having a high dielectric constant with holes of low dielectric constant in the form of a two-dimensional periodic lattice with imperfections photonic crystals formed in this manner are described, for example, in German Patent No. 195 33 148.

Depending on the specific requirements, the needles may stand on the insulating layer, which is less thick in the region of the photonic crystal than under the waveguides, or the needles may stand on the silicon substrate.

An advantageous further development of the circuit according to the present invention is that the spaces between the needles are filled with non-linearly optical material, and that the refractive index of the non-linearly optical material is adjustable by a voltage applied to field electrodes. It is thus possible to control, for example, the behavior of filters designed as integrated optical circuits; See also German Patent No. 195 42 058.

In a further advantageous embodiment the needles or holes are at an angle with respect to the optical axis. This allows the branching of light in one part of the wavelength range into a further plane of the integrated optical circuit. An alternative thereto is provided by another embodiment of the present invention, in which the at least one photonic crystal, due to the arrangement of the imperfections, represents a branch filter in which branched-off light of a selected wavelength range escapes laterally. The laterally emerging light can be guided further in various manners.

In another example embodiment of the present invention, laterally emerging light of different wavelength ranges is capable of being focused on different locations of a parallel-extending photonic crystal. Thus, a plurality of computing planes can be connected in a simple manner.

DETAILED DESCRIPTION

Figure 1:
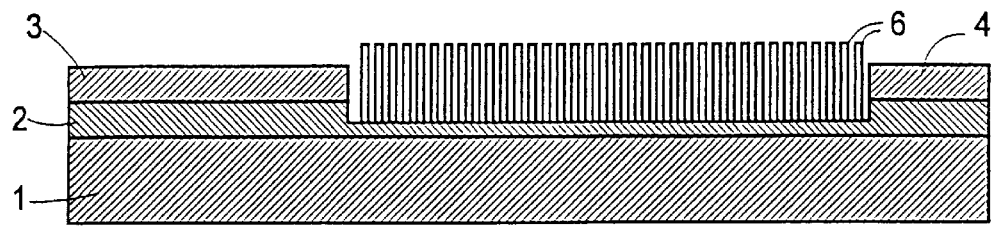
FIG. 1 shows a cross section of a segment from a circuit according to the present invention.

In the exemplary embodiment shown in FIG. 1, located on a silicon substrate 1 is an insulating layer 2 of silicon oxide, on which are applied optical strip waveguides 3, 4 made of silicon. Situated between waveguides 3, 4 is a photonic crystal 5 formed by a lattice of needles 6.

In the exemplary embodiment, needles 6 stand on insulating layer 2, which has a cavity in the region of photonic crystal 5. This, combined with the fact that the needles jut out beyond the upper boundary plane of waveguides 3, 4, means that the field conducted in edge areas outside of the waveguide is also covered by the photonic crystal.

Needles 6 may be produced in conventional manner by corpuscular-beam deposition. A process for this purpose is described, for example, in German Patent No. 195 33 148.

Figure 2:
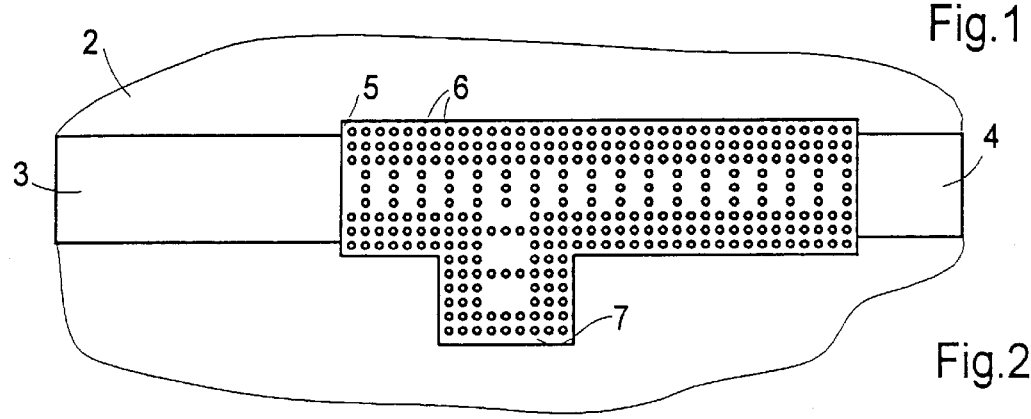
FIG. 2 shows a top view of the segment shown in FIG. 1.

As was demonstrated in S. Y. Lin, G. Arjavalingam: Optics Letters, Vol. 18, No. 19, 1666 (1990) with reference to experiments with millimeter waves, just six periods of the lattice with a lattice constant of one-third of the wavelength are sufficient to achieve an attenuation of 35 dB. Within the wavelength range thus attenuated, using selective imperfections, i.e., by the omission of needles, it is possible to create wavelength ranges of reduced attenuation. In the exemplary embodiment shown in FIGS. 1 and 2, light of a plurality of wavelengths is guided from waveguide 3 to waveguide 4, while light of a selected wavelength escapes at a branch 7. The selected spacings of the needles in the central region of the photonic crystal represent merely an example of a precise configuration for obtaining the respective filter characteristics to be achieved.

Figure 3:
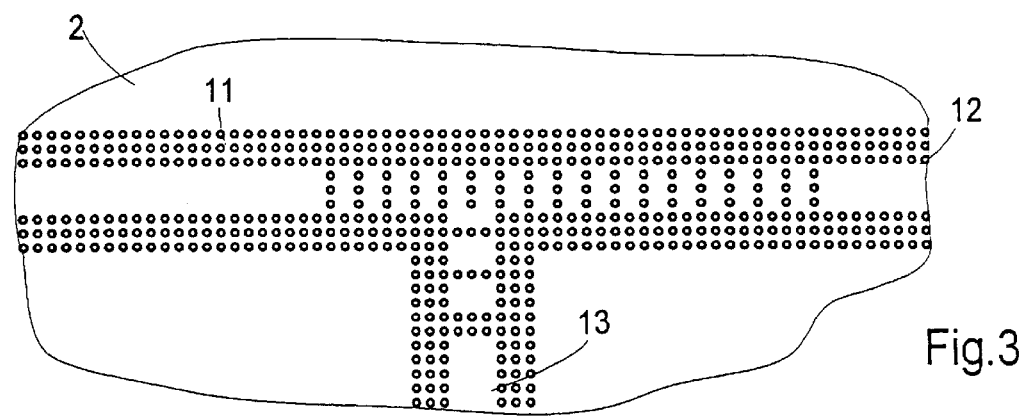
FIG. 3 shows a top view of a part of a further exemplary embodiment according to the present invention.

In the exemplary embodiment shown in FIG. 3, photonic crystals are provided not only for a filter, but also for the inlet and outlets, inlet 11 and outlets 12, 13 in each case being in the form of all-pass filters, in that no needles are provided in the central region.

Figure 4:
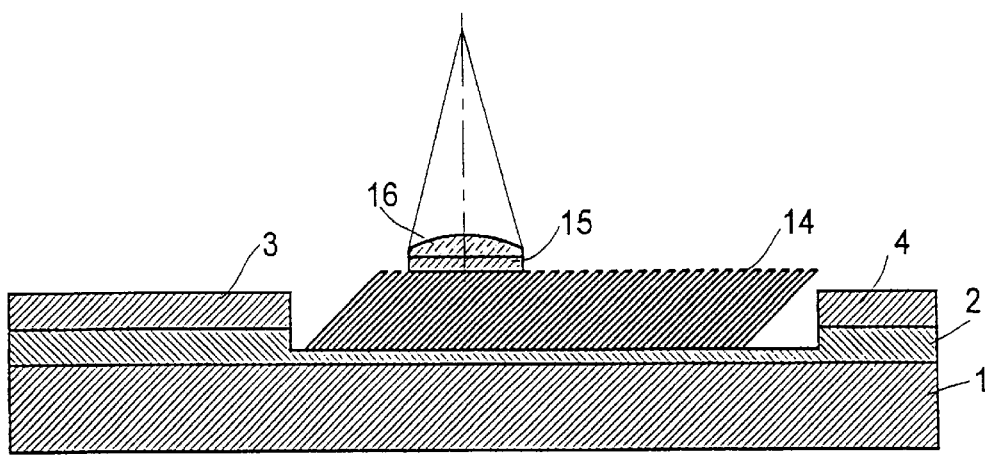
FIG. 4 shows an example of an optical connection of two planes of the integrated optical circuit according to the present invention.

FIG. 4 shows an exemplary embodiment in which needles 14 forming the photonic crystal are inclined. A covering layer 15 is provided in selected regions, so that light escapes there and is focused through mounted lenses 16, made for example of polymer material, into entrance windows (not shown) of an over-lying plane. This allows three-dimensional structures, such as in a computer circuit. The lenses may be produced in conventional manner by electron-beam lithography or using optical processes.

Figure 5:
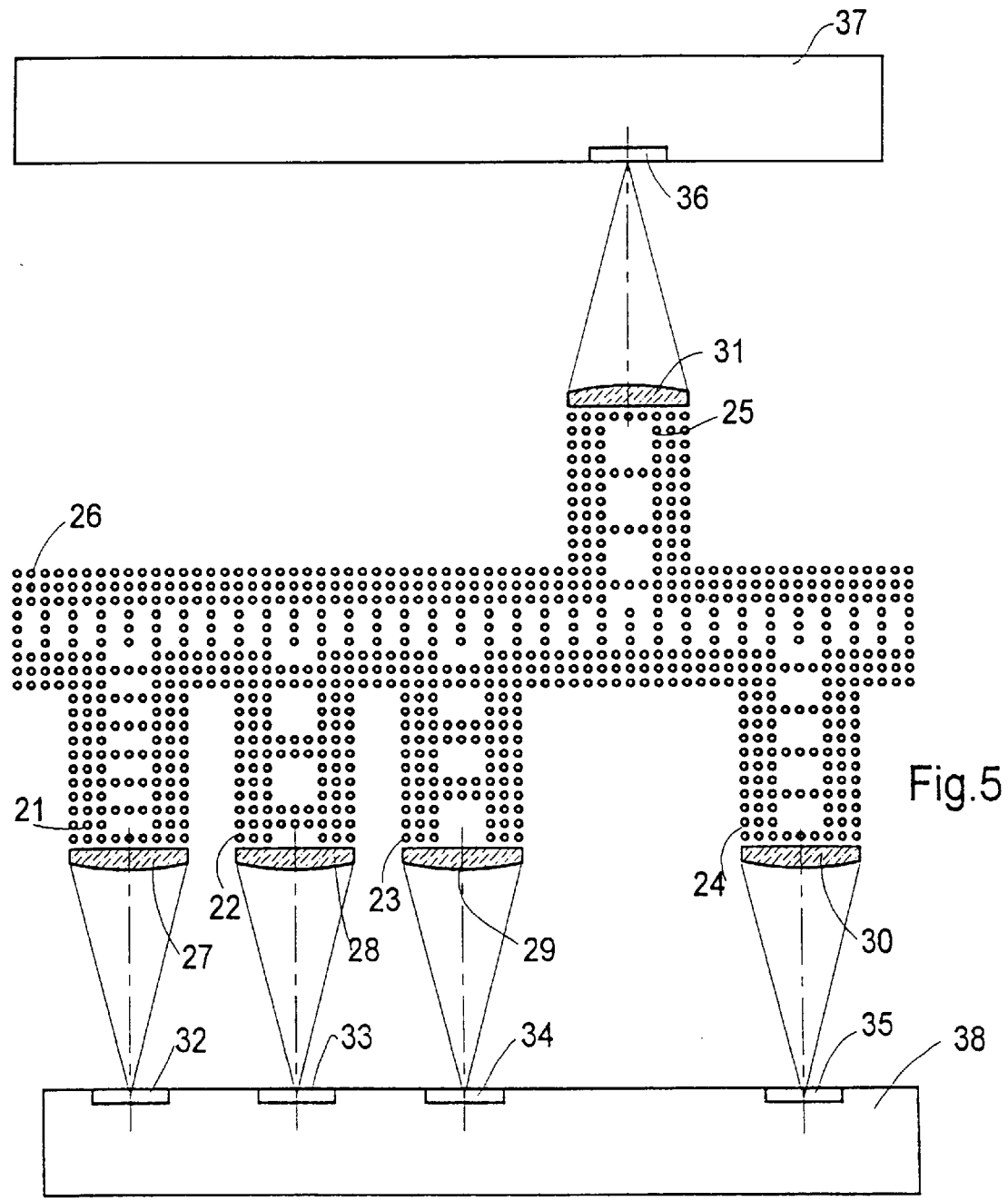
FIG. 5 shows a schematic representation of an example of an optical connection of a plurality of computing planes in a circuit according to the present invention.

FIG. 5 shows a segment from a circuit according to the present invention, in which a plurality of branches 21 to 25 are formed by a photonic crystal 26, a lens 27 to 31 focusing the light emerging from the branch onto entrance surfaces 32 to 36 disposed on further optical elements 37, 38 extending next to photonic crystal 26.

Figure 6:
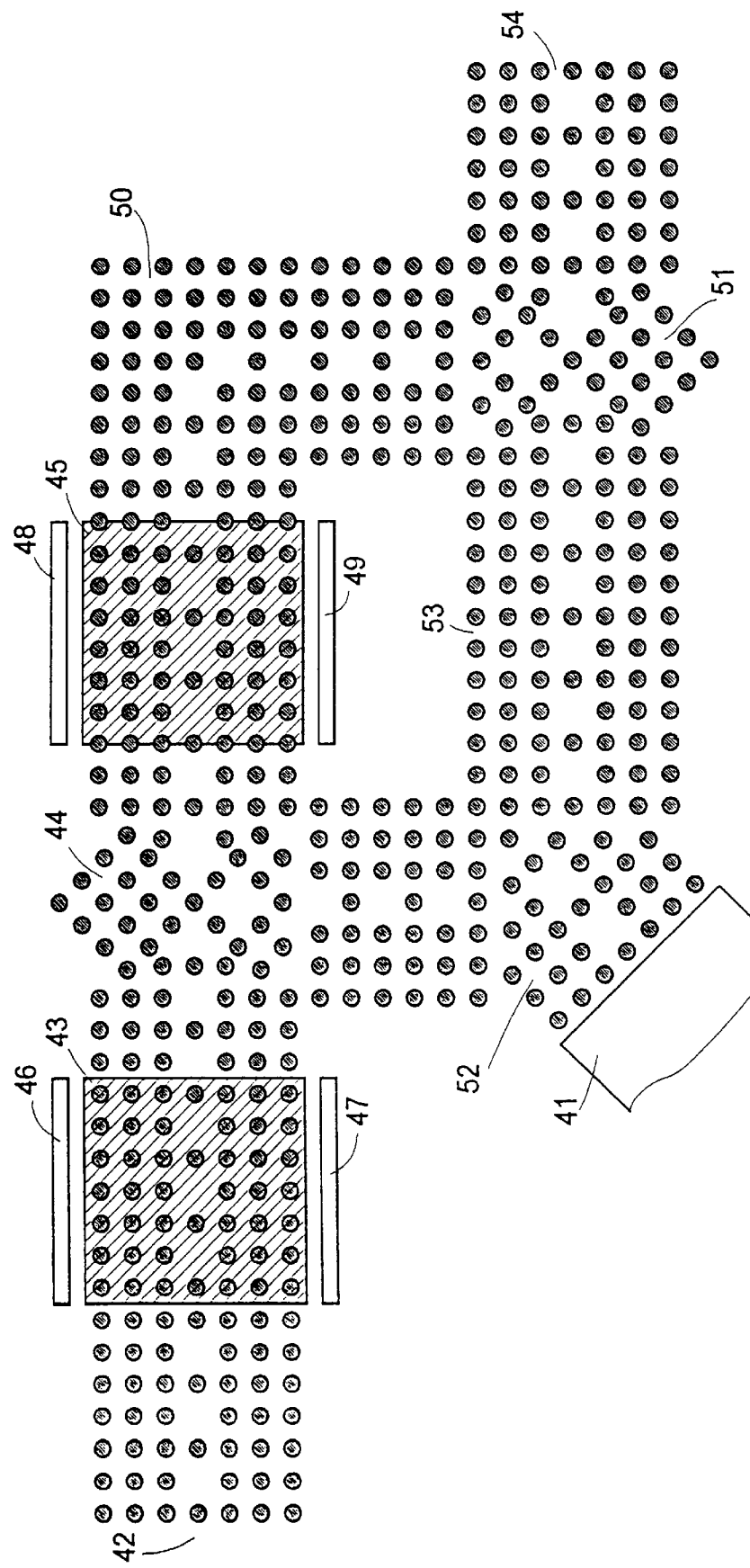
FIG. 6 shows a Mach-Zehnder interferometer implemented with an example circuit according to the present invention.

FIG. 6 shows an exemplary embodiment in the form of a Mach-Zehnder interferometer. In this case, all the elements, particularly waveguide, filter, mirror and beam splitter, are formed by photonic crystals. The interferometer is to be used to measure the transit time in a reflecting object to be measured 41 that is schematically shown in FIG. 6. For this purpose, the light supplied at 42 is first guided through an adjustable filter 43, with whose aid the wavelength to be used for measuring is selected. Using a beam splitter 44, the light emerging from filter 43 is guided in equal parts straight ahead to an adjustable phase shifter 45 and, in reflected form, to the object to be measured 41.

Adjustable filter 43 and adjustable phase shifter 45 are each made of a photonic crystal, the interspaces being filled with non-linearly optical material whose dielectric constant, and thus the optically active spacings of the needles, is controllable by voltages applied to electrodes 46, 47 and 48, 49.

Phase shifter 45 is adjoined by a completely reflecting mirror 50 which supplies the light emerging from phase shifter 45 to a further beam splitter 51.

Disposed in front of the object to be measured 41 is a photonic crystal in the form of a directional filter 42, with the effect that the light arriving from beam splitter 44 is guided into the object to be measured 41, and the light reflected in the object passes via a waveguide 43 to the further beam splitter 51. Both luminous fluxes overlap at output 54. Using a suitable measuring transducer, the intensity emerging from output 54 can be measured, and the phase shift in the object to be measured 41 can be determined by adjusting the phase at 45 to a minimum of the intensity at output 54. For the reasons described above, it is also possible to design the circuit shown in FIG. 6 to be extremely small, for example with an overall length of approximately 20 $\mu$m.

What is claimed is:

1. An integrated optical circuit, comprising:

a silicon substrate; and waveguides disposed on the substrate, at least one of the waveguides including a photonic crystal, the photonic crystal including elements formed by one of needles and bore holes, the elements being arranged an angle with respect to an optical axis and being arranged in parallel with one another.

2. The integrated optical circuit according to claim 1, wherein the waveguides include strip waveguides, the integrated optical circuit further comprising:

an insulating layer disposed between the strip waveguides and the silicon substrate, the photonic crystal extending from a plane below a lower boundary surface of the strip waveguides to beyond an upper boundary surface of the strip waveguides.

3. The integrated optical circuit according to claim 1, wherein the elements are formed by needles having high dielectric constants, the needles being arranged in a two-dimensional periodic lattice.

4. The integrated optical circuit according to claim 1, wherein the elements are formed by holes having low dielectric constants, the holes being arranged in a two-dimensional periodic lattice.

5. The integrated optical circuit according to claim 3, wherein the needles stand on the insulating layer, the insulating layer being less thick in a region of the photonic crystal than a region under the strip waveguides.

6. The integrated optical circuit according to claim 3, wherein the needles stand on the silicon substrate.

7. The integrated optical circuit according to claim 3, wherein spaces between the needles are filled with non-linearly optical material, a refractive index of the non-linearly optical material being adjustable by a voltage applied to field electrodes.

8. The integrated optical surface according to claim 1, wherein the photonic crystal includes imperfections, the photonic crystal being a branch filter as a result of an arrangement of the imperfections, branched-off light of a selected wavelength range emerging laterally from the branch filter.

9. The integrated optical surface according to claim 1, wherein laterally emerging light of different wavelength ranges is focused on different locations of a parallel extending photonic crystal.

* * * * *